(12) United States Patent
Ruan

(10) Patent No.: US 10,052,977 B2
(45) Date of Patent: Aug. 21, 2018

(54) RECLINE ASSEMBLY USED IN A REAR SEAT OF A VEHICLE

(71) Applicant: Ford Global Technologies, LLC., Dearborn, MI (US)

(72) Inventor: Alex Ruan, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/680,609

(22) Filed: Aug. 18, 2017

(65) Prior Publication Data

US 2018/0056818 A1 Mar. 1, 2018

(30) Foreign Application Priority Data

Aug. 23, 2016 (CN) .......................... 2016 1 0710493

(51) Int. Cl.
| | |
|---|---|
| B60N 2/02 | (2006.01) |
| B60N 2/22 | (2006.01) |
| B60N 2/36 | (2006.01) |
| B60N 2/20 | (2006.01) |
| B60N 2/90 | (2018.01) |

(52) U.S. Cl.
CPC ............ B60N 2/2245 (2013.01); B60N 2/20 (2013.01); B60N 2/366 (2013.01); B60N 2/919 (2018.02); B60N 2205/35 (2013.01)

(58) Field of Classification Search
CPC ...... B60N 2/2245; B60N 2/919; B60N 2/366; B60N 2/20; B60N 2205/35; B60N 2/02
USPC ..................................................... 296/65.16
See application file for complete search history.

(56) References Cited

U.S. PATENT DOCUMENTS

| | | | | |
|---|---|---|---|---|
| 6,328,381 B1* | 12/2001 | Smuk | ....................... | B60N 2/20 297/365 |
| 6,557,911 B2* | 5/2003 | Nelsen | ..................... | E05B 81/14 292/201 |
| 6,832,815 B2* | 12/2004 | O'Connor | ................ | B60N 2/20 297/378.12 |
| 7,494,187 B2* | 2/2009 | Inoue | ..................... | B60N 2/366 297/378.13 |
| 8,322,773 B2* | 12/2012 | Parnaik | .................... | B60N 2/36 296/37.16 |
| 8,573,699 B2* | 11/2013 | Zekavica | ............. | B60N 2/2245 296/65.16 |
| 9,114,740 B2* | 8/2015 | Bruck | ..................... | B60N 2/366 |
| 2004/0007909 A1* | 1/2004 | Bonk | ....................... | B60N 2/20 297/378.13 |

(Continued)

FOREIGN PATENT DOCUMENTS

| | | |
|---|---|---|
| JP | P2000255296 | 9/2000 |
| JP | P2011098583 | 5/2011 |

(Continued)

*Primary Examiner* — Pinel E Romain
(74) *Attorney, Agent, or Firm* — Vichit Chea; Mohr IP Law Solutions, PC

(57) ABSTRACT

A recline assembly used in a vehicle seat is provided. The recline mechanism comprises a recline mechanism and a guide bracket disposed on a vehicle body; a latch mechanism disposed on a seatback of the vehicle seat; and a striker coupled to the recline mechanism. One end of the strike is connected to the recline mechanism and another end of the strike passes through a guide slot of the guide bracket and is selectively locked to the latch mechanism.

19 Claims, 3 Drawing Sheets

(56) References Cited

U.S. PATENT DOCUMENTS

| | | | |
|---|---|---|---|
| 2005/0194826 A1* | 9/2005 | O'Callaghan | B60N 2/01583 297/378.13 |
| 2006/0108847 A1* | 5/2006 | O'Callaghan | B60N 2/01583 297/344.1 |
| 2009/0236880 A1 | 9/2009 | Villeminey | |
| 2011/0175420 A1 | 7/2011 | Bruck | |
| 2011/0260514 A1 | 10/2011 | Zekavica | |
| 2014/0327266 A1* | 11/2014 | Gholap | B60N 2/2245 296/65.16 |

FOREIGN PATENT DOCUMENTS

| | | |
|---|---|---|
| KR | 20070008029 | 1/2007 |
| KR | 20090055904 | 6/2009 |

* cited by examiner

RECLINE ASSEMBLY USED IN A REAR SEAT OF A VEHICLE

RELATED APPLICATION

This application claims the benefit of Chinese Patent Application No. CN 201610710493.7 filed on Aug. 23, 2016, the entire contents thereof being incorporated herein by reference.

FIELD

This invention relates to a recline assembly used in a vehicle rear seat, in particular, a recline mechanism mounted on a sidewall of a vehicle body.

Some SUVs and 5 door vehicles include adjustable split 60-40 rear seats. Such seat design provides a comfortable space, and rear seats are foldable for a spacious luggage room. In current designs, a rear seat row includes 4 high strength (3-4 kNm) recline mechanisms at a bottom of seatback to adjust a reclining angle of the seatback, and the recline mechanisms are installed at a seat mount bracket. The configuration has a high manufacture cost. Further, as the recline mechanism is disposed on the bottom of the seatback, the recline mechanism subject to a greater torque applied on the seatback which result in easy weariness of the recline mechanism. Furthermore, as the recline mechanism is disposed at the bottom of the seatback, a handle for the recline mechanism and a plastic housing to cover the recline mechanism need to be disposed at the bottom of the seatback, which affects the appearance of the rear seat and cause uncomfortableness of a passenger. Furthermore, since the seat bracket and the seat are preassembled together, they need to be carried into the vehicle and then the seat is fixed to a floor via fasteners in a narrow space, which increases the cost and difficult to install the seat.

SUMMARY

To address issues of the current technologies, this invention provides a recline assembly used in a vehicle seat with a lower cost. According to one aspect, a recline assembly used in a vehicle sea is provided. The recline assembly comprises a a recline mechanism and a guide bracket disposed on a vehicle body; a latch mechanism disposed on a seatback of the vehicle seat; and a striker. One end of the strike is connected to the recline mechanism and another end of the strike passes through a guide slot of the guide bracket and is selectively locked to the latch mechanism.

In one embodiment, the reline mechanism include an adjustment member, a first plate, and a second plate connected to the first connection plate via the adjustment member, and an adjustment handle positioned on the adjustment member. The first plate and the second plate are loaded via a torsion spring.

In another embodiment, the recline mechanism further includes a connection arm and the striker is pivotally connected to the second connection plate via the connection arm.

In another embodiment, the first plate is fixed on the vehicle body and the second plate is connected to the connection arm via a pivot.

In another embodiment, the first plate is formed integrally with the guide bracket.

In another embodiment, the striker is pivotally connected to the connection arm.

In another embodiment, the guide slot of the guide bracket has an arc shape.

In another embodiment, the latch mechanism includes a housing, a lock tongue positioned in the housing and configured to lock the striker, and a button disposed on the housing to unlock the lock tongue.

In another embodiment, the seatback includes an opening to expose the lock tongue, and the striker passes through the opening and is locked by the lock tongue at a locked position.

In another embodiment, an edge of the guide slot of the guide bracket comprised of POM plastic, and the striker is slidable on the POM plastic.

According to another embodiment, a recline assembly used in a rear seat of a vehicle is provided. The recline assembly includes a recline mechanism fixed on a sidewall of a vehicle body; a guide bracket coupled to the recline mechanism and fixed on a sidewall of the vehicle body, a striker pivotally coupled to the recline mechanism, and a latch mechanism disposed on a seatback of the rear seat and corresponding to the guide bracket at a locked position. The guide bracket includes an elongated slot extending along a lengthwise direction of the guide bracket and is configured to receive the strike and allow sliding movement of the strike. The latch mechanism is configured to retain the strike at the locked position and release the strike such that the seatback is foldable.

In one embodiment, the reline mechanism include a first plate fixed on the vehicle body, an adjustment member, and a second plate. The second plate is coupled to the first plate via the adjustment member, and coupled pivotally to the guide bracket. The first plate is configured to form an angle with the guide bracket.

In another embodiment, the recline mechanism further includes a connection arm. The connection arm is an elongated bar and includes a first hole to receive the strike and a second hole to receive a pivot connecting the second plate and the connection arm. The strike and the pivot constitute a double pivot connection to facilitate rotation of the adjustment member.

In another embodiment, the guide slot in the guide bracket has an arc shape similar to a reclining path of the seatback, and an edge of the guide slot is covered with Polyoxymethylene (POM) plastic.

According to another aspect of the present disclosure, a rear seat assembly in a vehicle is provided. The rear seat assembly comprises a mount bracket; a seatback disposed on the mount bracket and pivotable relative to the mount bracket; and a recline assembly. The recline assembly comprises a recline mechanism fixed on a sidewall of a vehicle body; a guide bracket coupled to the recline mechanism and fixed on a sidewall of the vehicle body, a striker pivotally connected to the recline mechanism and received in a guide slot of the guide bracket, and a latch mechanism disposed on an upper portion of a seatback of the vehicle seat and corresponding to the guide bracket at a locked position. The latch mechanism is configured to retain and release the strike.

In one embodiment, the guide slot of the guide bracket includes an elongated slot extending along a longitudinal direction of the vehicle.

In another embodiment, the recline mechanism and the guide bracket are packaged in the sidewall of the vehicle.

In another embodiment, the mount bracket is detachably connected to the seatback.

In another embodiment, a rear seat includes a first seatback and a second seatback fixed to a vehicle floor via three mount brackets. The recline assembly includes a first recline assembly and a second recline assembly. The first recline assembly connects the first seatback to a left sidewall of the vehicle and the second recline assembly connects the second seatback to a right sidewall of the vehicle, respectively at a locked position.

In another embodiment, the latch mechanism includes a lock tongue to retain the strike. The seatback includes an opening toward a side or a rear of the seatback and exposing the lock tongue.

The recline assemblies of the present disclosure have various advantages. For example, the recline assembly includes the latch mechanism and the recline mechanism, which achieves both reclining adjustment and locking/releasing of seatback and thus requires less parts. Since the recline mechanism and the guide bracket are packaged in the vehicle sidewall and the latch mechanism on the upper portion of the seatback is connected to the guide bracket via the strike, a high strength recline mechanisms is not required at the bottom of the seatback and only a pivot for the seatback rotation is needed at the bottom of the seatback. Further, the number of the recline mechanisms can be reduced while maintaining an equivalent strength, and thus the cost of vehicle seat can be reduced. Furthermore, the vehicle rear seats have a better appearance.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed recline assemblies in a vehicle seat will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various recline assemblies in a vehicle seat are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
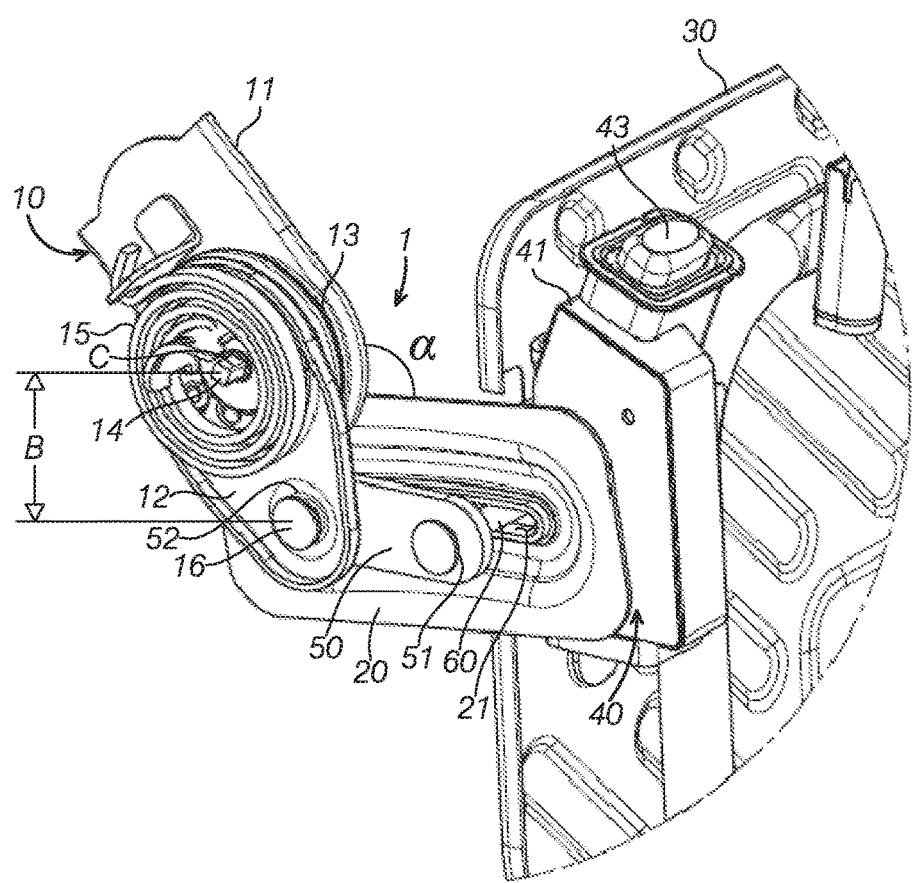
FIG. 1 a perspective view of a recline assembly according to one embodiment of the present disclosure, illustrating a connection with a rear seat.

Referring to FIG. 1, a recline assembly 1 used in a vehicle rear seat is illustrated according to one embodiment of the present disclosure. The recline assembly comprises a recline mechanism 10 and a guide bracket 20 that are positioned on a vehicle body; a latch mechanism 40 connected to a seatback 30 of the vehicle seat; and a striker 60 having one end connected to the recline mechanism 10 and another end selectively locked to the latch mechanism 40 by passing through a guide slot 21. In one or more embodiments, the recline mechanism 10 and the guide bracket 20 are dispose on sheet metal of the vehicle body adjacent sides of the seat. As the striker 60 can be selectively locked in the latch mechanism 40, no additional strike needs to be included on the vehicle body to lock the seatback 30, which simplified the locking mechanism. Further, the latch mechanism 10 and the guide bracket 20 are disposed on the vehicle body, since the latch mechanism 40 on the seatback 30 is connected to the recline mechanism and the guide bracket 20 via the strike 60, there is no need for a high strength recline mechanism and only a pivot needs to be disposed at the bottom of the seatback. The number of the recline mechanisms can be decreased, such as decreasing from four recline mechanisms for two seatbacks to two reline mechanisms for each seatback. Therefore, the cost of vehicle seat can be decreased significantly.

Referring to FIG. 1, the reline mechanism 10 includes an adjustment member 13, a first plate 11, and a second plate 12 connected to the first plate 11 via the adjustment member 13, and an adjustment handle 14 positioned on the adjustment member 13. The first plate 11 and the second plate 12 may be loaded via a torsion spring 15. The adjustment member 13 may an adjustment member conventionally used in the art. In one example, the adjustment member 13 may be T2000 type adjustment member, which may comprise one of a cam, a seal ring, Ω spring, a lock spring, a wedge, a self-lubricated bearing, an outer gear, an inner gear, and a plastic clip ring. The recline adjustment may be realized via a planetary gear mechanism. It will be understood that the recline mechanism 10 may be a recline mechanism that sets up the seatback at a plurality of rest positions or a recline mechanism that sets up the seatback to any positions in a reclining range.

Referring to FIG. 1, in some embodiments, the recline assembly may further includes a connection arm 50. The striker 60 is pivotally connected to the second plate 12 via the connection arm 50. The connection arm 50 may be an elongated bar and include a first hole 51 to receive the strike 60 and a second hole 52 to receive a pivot 16 that connects the second plate 12 and the connection arm 50.

The first plate 11 is fixed on the vehicle body (not shown) and the second plate 12 is connected to the connection arm 50 via a pivot 16. The striker 60 is pivotally connected to the connection arm 50. Specifically, the striker 60 is pivotally connected to the connection arm 50, and the second plate 12 is connected the connection arm 50 via the pivot 16, which form a mechanism of double pivot connection. Therefore, the striker 60 may be slidable in the guide slot 21 in any angle and locked at any suitable position to retain the seatback 30 at any suitable position. In some embodiments, the first plate 11 is configured to form an angle α with the guide bracket 20. The double pivot connection allows a wide rotation range to allow flexible arrangement of the first plate 11 relative to the guide bracket 20 and provides flexibility on the packaging.

In other embodiments, the striker 60 may be pivotally connected to the second plate 12 directly without a connection arm 50. The guide slot 21 may be configured to have a curved profile consistent with an arc track that the end of the second plate 12 moves.

Figure 3:
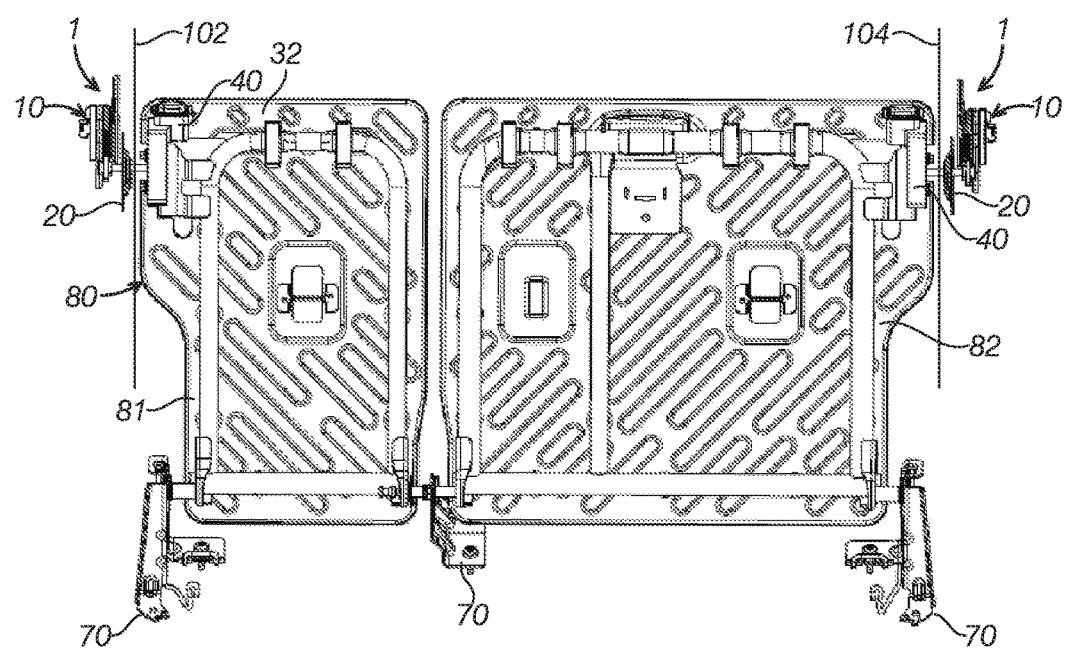
FIG. 3 is a front view of a rear seat row in a vehicle.

In some embodiments, the guide bracket 20 may be secured on a sidewall of the vehicle and substantially parallel to a surface of the sidewall as illustrated in FIG. 3. In some embodiments, the first plate 11 may be formed integrally with the guide bracket 20. Since both the first plate 11 and guide bracket 20 are fixed on the vehicle body, the first plate 11 and the guide bracket 20 may be configured integrally as a piece to firmly secure the first plate 11 and the guide bracket 20 together and save the cost as well. It will be understood that the first plate 11 and guide bracket 20 may be configured separately as shown in FIG. 1.

Figure 2:
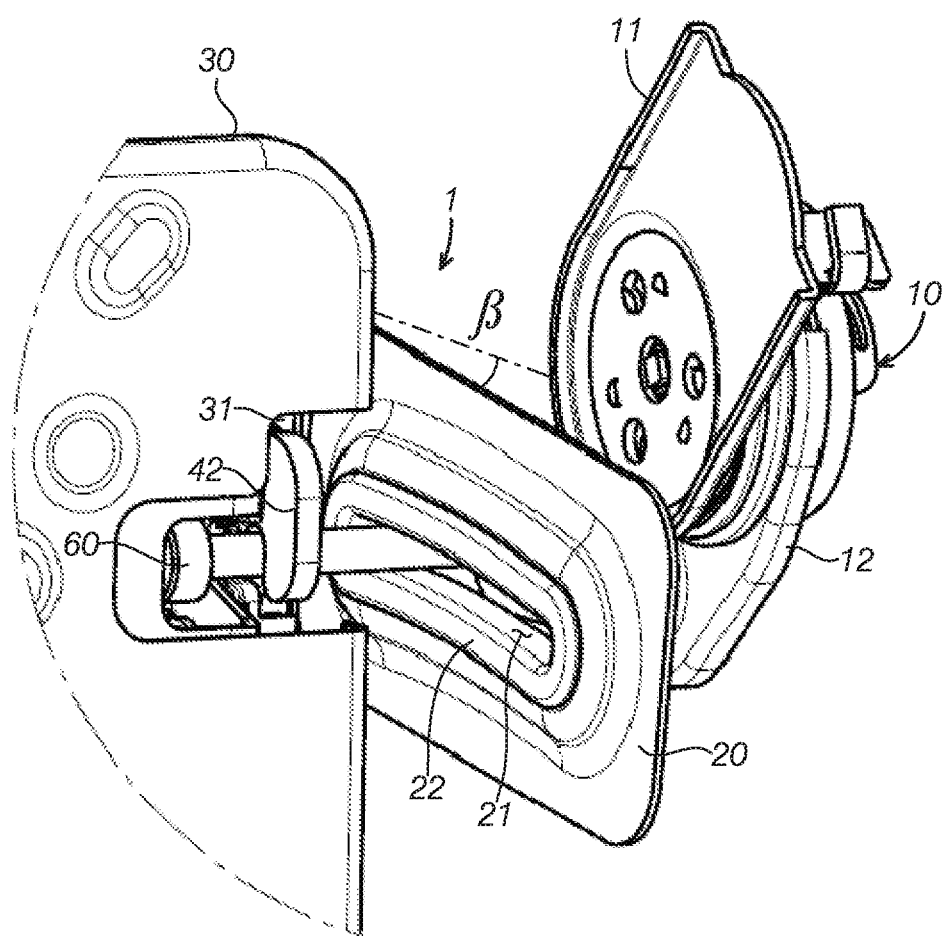
FIG. 2 is a perspective view of the reclining mechanism in FIG. 1 from another viewing angle.

The guide slot 21 of the guide bracket 20 the guide bracket may be an elongated slot extending along a lengthwise direction of the guide bracket. In some embodiments, the guide slot 21 may be parallel to a longitudinal direction L of the vehicle. In some embodiments, the guide slot 21 may form an angle to the longitudinal direction L. In some embodiments, the guide slot may have curved shape similar to a reclining path of the seatback 30. The guide slot 21 may define a recline range of the seatback. Referring to FIG. 2, the guide slot 21 of the guide bracket 20 may have an arc shape and the guide bracket 20 may include durable material 22 surrounding the guide slot 21. In one or more embodiments, the durable materials 22 may be polyoxymethylene (POM) plastic 22. The POM plastic 22 may be coated or covered on an edge of the guide slot 31. The striker 60 slides on the POM plastic 22. POM plastic is a linear polymer having high density and high crystal without side chains and characterized by its high hardness and rigidity. The POM plastic is primarily used for gear, bearing, vehicle parts, machines, and instrument as frame. By using POM plastic 22 to form the guiding slot 21, the striker 60 and the guide slot 21 can be configured to be generally no gap in-between and the striker 60 can be slidable in a smooth manner. In this way, weariness can be decreased so that the recline assembly will have a longer life span. Further noise can be reduced.

Referring to FIGS. 1 and 2, when the reclining needs to be adjusted, the adjustment member 13 may be unlocked or actuated via any appropriate mechanisms in the art such as a pulling rod or a cable. Once unlocked, the second plate 12 can pivots relative to the first plate 11 fixed on the vehicle body under a bias force of the spring 15. The second plate 12 may drive the pivot 16 to move and thus further drive the connection arm 50 and striker 60 to move in the guide slot 21. In an embodiment without the connection arm, the second plate 12 may drive the striker 60 to move in the guide slot 21. Since the striker 60 and the seatback 30 are locked via the latch mechanism 40, movement of the striker 60 drives the seatback 30 to pivot to perform the reclining adjustment. The recline mechanism may be configured to set the seatback 30 in a plurality of check positions or rest positions. Alternatively, the recliner mechanism may be configured to adjust the seatback 30 to any positions at a range of reclining adjustment.

Referring to FIGS. 1 and 2, the latch mechanism 40 may be disposed on a side of the seatback 30. At a locked position, the latch mechanism corresponds to the recline mechanism disposed on a sidewall of the vehicle body. The latch mechanism 40 includes a housing 41, a lock tongue 42 positioned in the housing 41 and configured to lock the striker 60, and a button 43 disposed on the housing 41 to unlock the lock tongue 42. The latch mechanism 40 in this embodiment may be any suitable lock mechanism used in the art. In one embodiment, one end of the lock tongue 42 can be configured as a hook, and another end is biased by the spring to retain the hook at the locked position. When the striker 60 hits the hook from outside, the hook can be opened such that the striker 60 is slid into the latch mechanism 40 to be locked by the hook. When the button 43 is pressed, a force opposite to the spring force is applied on the lock tongue 42 to open the hook such that the striker 60 is released from the hook.

Referring to FIG. 2, the seatback 30 includes an opening 31 to expose the lock tongue 42. The striker 60 passes through the opening 31, and is locked by the lock tongue 42. With such configuration, it is easy for the striker 60 to be locked or unlocked in the latch mechanism 40. In one or more embodiments, the opening 31 opens towards to the sidewall or/and backwall of the seatback.

Referring to FIG. 3, the present invention provides a rear seat in a vehicle. The rear seat comprises assembling bracket 70; a seatback 30 disposed on the mount bracket 70 and is pivotable relative to the mount bracket 70; and a recline assembly 1. The recline assembly 1 includes the latch mechanism 40 disposed on an upper portion of the seatback 30. As described above, the recline assembly 1 includes a recline mechanism 10 and the guide bracket 20. The recline mechanism 10 and the guide bracket 20 are disposed on side walls 102, 104 of a vehicle body and correspond to the latch mechanism 40 at the locked position. In the depicted embodiment, the recline mechanism is adjacent to a top portion 32 of seat back. In the conventional recline assembly used in a vehicle seat, the recline mechanism is disposed at a bottom of the seatback, which has a long loading arm (i.e., a distance from the recline mechanism at the bottom of the seatback to an upper portion of the seatback). In the embodiments depicted in FIG. 1 of the present disclosure, the loading arm B is a distance from a pivot 16 to a center C of the adjustment member 13, which is shorter than the loading arm in the conventional recline assembly. In other words, the torsion applied to the recline assembly 1 is lower. A middle strength recline mechanism can be used for one seatback in the recline assembly 1 instead of two high strength recline mechanisms required for one seatback in the conventional technologies. Further, s the recline assembly is not disposed on the bottom of the seatback, a handle and a plastic housing are not needed on the bottom of the seatback. Thus, the entire seatback can be wrapped with decorative material to improve its appearance and provide comfort to the passenger. In the depicted embodiment, the recline mechanism 10 and guide bracket 20 are disposed at the vehicle sidewall 102, 104 adjacent to the upper portion of seatback and thus reducing the torque applied on the recline mechanism. It will be understood that the recline mechanism 10 and the guide bracket 20 may be disposed at any other suitable positions, such as at higher or lower position than that shown in the figures, to obtain the same result of locking or unlocking seatback and adjustment on the recline.

In some embodiments, the recline mechanism 10 and the guide bracket 20 may be packaged in the vehicle sidewall and invisible from the view of the driver or the passengers and thus improving appearance of the vehicle sidewall.

In some embodiments, the mount bracket 70 may be detachably connected to the seatback 30. With such connection, the mount bracket 70 can be installed on the vehicle floor first and then the seatback 30 is assembled on the mount bracket 70. Such separate steps simplify assembling process and reduce a cost.

Referring to FIG. 3, a rear seat 80 includes three mount brackets 70, and a first seatback 81 and a second seatback 82 fixed to a vehicle floor via the three mount brackets 70 at the bottoms. The first and second seatbacks 81, 82 may be folded separately. An upper portion of the first seatback is connected to a first sidewall 102 of the vehicle and an upper portion of the second seatback 82 is connected to a second sidewall 104 of the vehicle via the two recline assemblies 1, respectively. Since the recline mechanism is not disposed at the bottom of the seatbacks 81, 82, a high strength recline mechanism is not needed and only a pivot may be disposed at bottom of the seatback for the rotation of the seatback. Further, the number of recline mechanisms can be reduced. For example, only two recline assemblies are provided for the two seat backs while four recline assemblies are required for two seatbacks in the conventional technologies. Thus, cost of the vehicle seat can be reduced significantly.

Referring to FIG. 2, in some embodiments, the seatback 30 includes an opening 31 to expose the lock tongue 42 of the latch mechanism 40, and the opening 31 opens toward a rear of the seatback. With such configuration, it is easy for the striker 60 to be locked or unlocked in the latch mechanism. When the striker is unlocked, the seatback 30 can be folded back to a level parallel to a seat cushion of the seat to provide a larger storage space.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A recline assembly used in a vehicle seat, comprising:
    a recline mechanism and a guide bracket, wherein the recline mechanism and the guide bracket are disposed on a vehicle body;
    a latch mechanism disposed on a seatback of the vehicle seat; and
    a striker, wherein one end of the strike is connected to the recline mechanism and another end of the striker passes through a guide slot of the guide bracket and is selectively locked to the latch mechanism.

2. The recline assembly of claim 1, wherein the reline mechanism includes an adjustment member, a first plate, and a second plate connected to the first connection plate via the adjustment member, and an adjustment handle positioned on the adjustment member, and wherein the first plate and the second plate are loaded via a torsion spring.

3. The recline assembly of claim 2, wherein the recline mechanism further includes a connection arm and the striker is pivotally connected to the second connection plate via the connection arm.

4. The recline assembly of claim 3, wherein the first plate is fixed on the vehicle body and the second plate is connected to the connection arm via a pivot.

5. The recline mechanism of claim 4, wherein the first plate is formed integrally the guide bracket.

6. The recline assembly of claim 1, wherein the striker is pivotally connected to the connection arm.

7. The recline assembly of claim 1, wherein the guide slot of the guide bracket has an arc shape.

8. The recline assembly of claim 1, wherein the latch mechanism includes a housing, a lock tongue positioned in the housing and configured to lock the striker, and a button disposed on the housing to unlock the lock tongue.

9. The recline assembly of claim 8, wherein the seatback includes an opening to expose the lock tongue, and wherein the striker passes through the opening and is locked by the lock tongue at a locked position.

10. The recline assembly of claim 1, wherein an edge of the guide slot of the guide bracket is coated with POM plastic, and the striker is slidable on the POM plastic.

11. A recline assembly used in a rear seat of a vehicle, comprising:
    a recline mechanism fixed on a sidewall of a vehicle body;
    a guide bracket coupled to the recline mechanism and fixed on a sidewall of the vehicle body, wherein the guide bracket includes an elongated slot extending along a lengthwise direction of the guide bracket;
    a striker pivotally connected to the recline mechanism and received in the guide slot, and
    a latch mechanism disposed on a seatback of the rear seat and corresponding to the guide bracket at a locked position,
    wherein the latch mechanism is configured to retain the strike at the locked position and release the strike such that the seatback is foldable.

12. The recline assembly of claim 11, wherein the recline mechanism includes:
    a first plate fixed on the vehicle body,
    an adjustment member, and
    a second plate, wherein the second plate is coupled to the first plate via the adjustment member, and coupled pivotally to the guide bracket, wherein the first plate is configured to form an angle with the guide bracket.

13. The recline assembly of claim 11, wherein the recline mechanism further includes a connection arm, wherein the connection arm is an elongated bar and includes a first hole to receive the strike and a second hole to receive a pivot connecting the second plate and the connection arm and wherein the strike and the pivot constitute a double pivot connection.

14. The recline assembly of claim 11, wherein the guide slot in the guide bracket has an arc shape similar to a reclining path of the seatback, and wherein an edge of the guide slot is covered with Polyoxymethylene (POM) plastic.

15. A rear seat assembly in a vehicle, comprising:
    A rear seat;
    a mount bracket:

a seatback disposed on the mount bracket and pivotable relative to the mount bracket;
a recline assembly including:
a recline mechanism fixed on a sidewall of a vehicle body;
a guide bracket coupled to the recline mechanism and fixed on a sidewall of the vehicle body, wherein the guide bracket includes an elongated slot extending along a longitudinal direction of the vehicle;
a striker pivotally connected to the recline mechanism and received in the guide slot, and
a latch mechanism disposed on an upper portion of the seatback of the rear seat and corresponding to the guide bracket at a locked position, wherein the latch mechanism is configured to retain and release the strike.

16. The rear seat assembly of claim 15, wherein the recline mechanism and the guide bracket are packaged in the sidewall of the vehicle.

17. The rear seat assembly of claim 15, wherein the mount bracket is detachably connected to the seatback.

18. The rear seat assembly of claim 15, wherein the rear seat includes a first seatback and a second seatback fixed to a vehicle floor via three mount brackets, wherein the recline assembly includes a first recline assembly and a second recline assembly, wherein the first recline assembly connects the first seatback to a left sidewall of the vehicle and the second recline assembly connects the second seatback to a right sidewall of the vehicle, respectively at the locked position.

19. The rear seat of assembly claim 15, wherein the latch mechanism includes a lock tongue to retain the strike, wherein the seatback includes an opening toward a side or a rear of the seatback and exposing the lock tongue.

* * * * *